United States Patent Office 3,218,268
Patented Nov. 16, 1965

3,218,268
SELECTIVE HYDROGENATION CATALYST
Melvin R. Arnold, Louisville, Ky., assignor to Chemetron Corporation, Chicago, Ill., a corporation of Delaware
No Drawing. Filed July 18, 1962, Ser. No. 210,819
2 Claims. (Cl. 252—465)

This invention relates to the hydrogenation of acetylenes in the presence of conjugated diolefins and especially to the selective hydrogenation of four-carbon acetylenes in the presence of butadiene. More particularly, this invention relates to the selective hydrogenation of acetylenes in the presence of diolefins by use of a palladium-copper or a palladium-copper-chrominum catalyst.

This invention has particular application to the removal of four-carbon acetylenic hydrocarbons (ethylacetylene, dimethylacetylene and vinylacetylene) from 1,3-butadiene which is to be used for the production of synthetic rubber and similar polymeric materials. Butadiene for such purposes should contain not more than 100 parts per million of acetylenic compounds. It is, therefore, an object of this invention to provide a procedure and a group of palladium-copper catalysts which are highly effective in the selective hydrogenation of acetylenic hydrocarbons in the presence of conjugated diolefins such as butadinene. It is a further object to provide palladium-promoted copper-chrominum catalysts for such purposes. Another object is to provide a method for the selective hydrogenation of acetylenic compounds in the presence of conjugated diolefins wherein a relatively slight excess of hydrogen is used and the hydrogen which is consumed is practically all used in reducing the acetylenic triple bond. These and other objects are apparent from and are achieved in accordance with the following disclosure.

It has long been known that the selective hydrogenation of acetylenic compounds in the presence of conjugated diolefins is very difficult to accomplish because the rate of reaction between acetylenic compounds and hydrogen is only silghtly different from the rate or reaction between conjugated diolefins and hydrogen. A further complicating factor is that butadiene and four-carbon acetylenes are isomers and hydrogenation catalysts can induce isomerization. Any isomerization of butadiene to a four-carbon acetylene will, of course, reverse the purification procedure whereby the acetylenes are preferentially hydrogenated and removed from the butadiene. Consequently, any catalyst which induces isomerization of butadiene to a four-carbon acetylene will not be an effective catalyst for the purification of butadiene by selective hydrogenation.

In accordance with this invention, it has been found that acetylenic hydrocarbons in streams of conjugated diolefins can be removed by selective hydrogenation over palladium-promoted copper or copper-chromium catalysts wherein the acetylenes are reduced to olefins, or, in some cases, to paraffins. It has been found that the selective hydrogenation reaction occurs in the presence of relatively small amounts of hydrogen, that is, 2 to 5 moles of hydrogen per mole of acetylenic hydrocarbon to be reduced, although larger excesses of hydrogen in the range of 5 to 10 moles per mole of acetylenic hydrocarbon can be used. An important feature of this invention is the fact that the reaction can be carried out at temperatures as low as 100° F. Ordinarily, the reaction proceeds smoothly at low temperatures of 100–200° F., although higher temperatures of 200–300° F. can be used, but the latter are not desirable since higher temperatures induce polymerization of the butadiene or other conjugated diolefins. Space velocities of 500–1000 volumes/hour are operative, but velocities of 100–500 volumes/hour are preferred for better acetylene clean-up.

The palladium-copper catalyst of this invention is copper oxide, preferably black cupric oxide, on which is deposited 0.04% to 1% palladium, particularly on the surface thereof. The copper oxide may be supported on anhydrous alumina or may be combined with calcium aluminate cement prior to treatment with a pallidum solution to cause deposition of palladium on the surface of the copper oxide catalyst.

The palladium-copper-chromium catalyst used in this invention is a combination of copper oxide and chromium oxide containing 20–70% copper oxide and 80–30% chromium oxide which is promoted with palladium. The preferred catalyst for carrying out the process of this invention comprises copper and chromium in oxide form with pallidum deposited on the surface. This catalyst can comprise a physical mixture of copper oxide and chromium oxide or it can be a copper chromite salt or combinations thereof, coated with a solution of a palladium salt. Copper, as is well known, may have a valence of one or two and chromium is known to have several possible valence states ranging up to +6 down to at least +3. Accordingly, many complex chemical forms are possible when copper, chromium and oxygen are combined, and for simplicity, the complex oxide mixture or compound mixture forming the basis of the catalyst shall be referred to herein and in some of the claims as copper chromite. Moreover, the catalyst operates in a reducing atmosphere and the precise degree of oxidation of the metals under operating conditions is not known. A suitable catalyst, however, has been found to be the copper-chromium complex prepared by the procedure described in the Lazier Patent No. 2,088,425 (Example 1) and in "Organic Syntheses," volume 19, pp. 31–35. Suitable copper chromite hydrogenation catalysts can also be produced by treating an aqueous solution containing chromium and copper with ammonia or other water-soluble base to precipitate a mixture of cupric and chromic oxides and by calcining the precipitate at a temperature sufficiently high to convert the mixture into the complex oxide form of copper and chromium which is evidenced by a black color. In many instances, 600–800° F. is sufficient for this. The copper chromite complex may be present by itself or may be supported upon or in conjunction with a conventional catalytic binder such as hydraulic cement, alumina, etc.

The promotion of the catalytic activity with a highly active hydrogenation catalytic metal such as palladium is advantageous for selective hydrogenation of acetylenes. For instance, copper-chromium catalysts activated by the addition of 0.04% to 1.0% of palladium are highly effective as selective hydrogenation catalysts in accordance with the procedures of this application. The palladium-promoted copper-chromium catalysts are produced by spraying pellets, tablets or granules of a copper-chromium catalyst with a solution of water-soluble palladium salt, preferably a concentrated solution containing 5 to 10 grams of palladium per 100 milliliters. By use of a concentrated solution the palladium is deposited predominantly on the surface of the catalyst pellets rather than being absorbed uniformly throughout. This procedure produces a highly effective catalyst using relatively small amounts of palladium. It is also effective in depositing palladium on copper oxide catalysts.

By the procedure of this invention butadiene containing as much as 1000–2000 p.p.m. of a four-carbon acetylene is passed over the catalyst at a temperature in the range of 100–250° F. at a pressure not to exceed the dew point of butadiene at the temperature and at a space velocity in the range of 300–1000 volumes per hour, based on the volume of catalyst. Hydrogen is fed into the butadiene stream at a rate equal to approximatetly 2 to 5 moles of hydrogen per mole of acetylene. In actual operation the butadiene feed can be maintained as a liquid under hydrogen pressure and can be vaporized through an orifice upstream of the catalyst bed. The hydrogen concentration of the feed can be varied by varying the hydrogen pressure on the feed tank. The hydrogenation step is preferably conducted in a stainless steel jacketed reactor.

The invention is disclosed in further detail by means of the following examples which are provided for purposes of illustration only and are not intended to limit the invention in scope. It will be readily understood by those skilled in the art that various modifications in operating conditions and equivalent materials can be made within the scope of the disclosure without departing from this invention.

*Example I*

A stream of C.P. grade butadiene containing 1700 p.p.m. $C_4$ acetylene (vinylacetylene plus ethylacetylene in approximately equal amounts) was passed over a palladium-copper catalyst containing 55% CuO and 0.55% Pd supported on C–31 alumina in the form of 3/16" x 1/8" pellets, at 200° F., 15 p.s.i.g., 360 hourly space velocity. To the butadiene stream was added hydrogen in a concentration of 3.5 moles per mole of contaminant acetylene. After four hours on stream there was no acetylene leakage and only 53.0% of the hydrogen (approximately 5900 p.p.m.) was reacted. Average crush strength of the catalyst after testing was 10 lbs. d.w.l.

The palladium-copper catalyst was prepared by precipitating copper oxide from an aqueous copper nitrate solution, in which the alumina was suspended, by addition of aqua ammonia, according to Example I of Lazier Patent No. 2,088,425. The precipitate was filtered, dried and calcined at 800° F., pelleted, then sprayed with a 10% aqueous palladium nitrate solution and dried. The catalyst was reduced with dry hydrogen at an average temperature of 500° F. at 500 hourly space velocity and atmospheric pressure for 17 hours.

*Example IA*

The reaction described in Example I was continued for 12 hours. After 12 hours the acetylene clean-up had decreased to 31% (1160 p.p.m. acetylene leakage). At this point the catalyst was replaced by reduced copper-chromite catalyst (50% CuO, 43% $Cr_2O_3$) pellets (3/16" x 3/16") prepared by "Organic Syntheses," volume 19, pp. 31–35, on which had been deposited 0.047% Pd (by analysis). After six hours operation at 150° F., 15 p.s.i.g., 360 hourly space velocity and 3:1 mole ratio of hydrogen to acetylenes, acetylene removal was complete (1870 p.p.m. fed) and 70.2% of 5000 p.p.m. hydrogen was reacted.

When the catalyst was replaced with a reduced copper-chromite catalyst as described in Example IA on which 0.41% Pd (by analysis) had been deposited, complete acetylene clean-up over a period of five days was attained under the operating conditions set for above.

*Example II*

A copper-chromite catalyst prepared as in Example IA (57.5% copper oxide and 42.5% chromium oxide) was activated with palladium according to the following procedure: 456 grams of the dry tableted catalyst was sprayed with 27 ml. of aqueous palladium nitrate solution containing 10 grams of palladium per 100 ml. and an additional 62 ml. of water. Some of the water was sprayed on the catalyst as a rinse solution. The catalyst was calcined at 800° F. for approximately 9 hours and had an average crush strength of 9.5 lbs. d.w.l. On analysis it was found to contain 0.41% Pd. The catalyst was then reduced at 500° F. and atmospheric pressure for 19.5 hours in a dry stream of 3% hydrogen in nitrogen.

A feed stream composed of C.P. grade butadiene containing approximately 1350 p.p.m. of four-carbon acetylene (vinylacetylene plus ethylacetylene) was passed over the catalyst at 150° F., 15 p.s.i.g., 360 hourly space velocity and a 4:1 ratio hydrogen to contaminant acetylene. Acetylene leakage did not exceed 20 p.p.m. during 120 hours on stream. Hydrogen consumption after 120 hours on stream was 5300 p.p.m. of a total of 5520 p.p.m. fed in (96%). Average crush strength of the catalyst after testing was 18 lbs. d.w.l.

*Example III*

A copper-chromium catalyst was prepared as follows: A solution of 560 lbs. of chromium trioxide in 500 gallons of water was pumped into a precipitation tank. Then a solution of 2000 gallons of cupric nitrate containing 389 lbs. of copper was added and the resulting solution was diluted to 3200 gallons with water. The copper chromium solution was maintained at 100° F. and aqua ammonia added by gravity at a rate of ½ gallon per minute until the pH was in the range of 5.5 to 6.8. The precipitate of mixed copper and chromium oxides was collected on a filter, dried and calcined at 800° F. until a uniform, jet black product was obtained. 50 parts of calcined copper and chromium oxides, 30 parts of calcium aluminate cement (CA–25) and 20 parts of alumina (Alcoa C–31) were admixed by wet mulling and then tableted into tablets 3/16" x 3/16". After steaming and drying 250 grams of the catalyst tablets were then sprayed with 40 ml. of aqueous palladium nitrate solution containing 1.5 grams of palladium. The catalyst was then calcined at 800° F. for approximately 12 hours. After calcination the catalyst had an average crush strength of 135 lbs. d.w.l. and contained 0.41% Pd by analysis. Prior to use the catalyst was reduced for 90 hours at an average temperature of 500° F. at an hourly space velocity of 500 with a stream of 5% hydrogen in nitrogen.

A stream of C.P. grade butadiene containing 1530 p.p.m. of four-carbon acetylenes was passed over the catalyst at 150° F., one atmosphere pressure, 720 hourly space velocity and 4:1 mole ratio hydrogen to contaminant acetylenes. After two hours on stream acetylene leakage was 13 p.p.m. and approximately 6000 p.p.m. of hydrogen was reacted (99% of the hydrogen feed). The average crush strength of the catalyst after testing was 72 lbs. d.w.l.

*Example IV*

A copper-chromium catalyst was prepared by wet mulling 80 parts of mixed copper and chromium oxides (as prepared in Example III) with 20 parts of calcium aluminate cement (CA–25) and then pressing the material into 3/16" by 3/16" tablets. After steaming and drying, 225 grams of the catalyst tablets was sprayed with 38 ml. of an aqueous solution of palladium nitrate containing 1.35 grams of palladium. Then the catalyst was calcined at 800° F. for 12 hours. The calcined catalyst had an average crush strength of 36 lbs. d.w.l. The catalyst contained 0.42% palladium on analysis.

The catalyst was reduced at 500° F. for 20 hours in a stream of 5% hydrogen in nitrogen. A feed material as described in Example III was passed over the catalyst at 150° F., 15 p.s.i.g., and 360 hourly space velocity and a 3.5:1 hydrogen to acetylene mole ratio. After 24 hours on stream, acetylene leakage was only 35 p.p.m. (97.8% clean-up). No hydrogen was detected in the effluent (5270 p.p.m. reacted). Average crush strength of the catalyst after testing was 25 lbs. d.w.l.

*Example V*

The copper-chromite catalyst of Example IA was sprayed with a palladium nitrate solution to coat the surface of the catalyst with palladium. The total palladium deposited on the catalyst was 0.047% by analysis. A stream of butadiene containing 1700 p.p.m. of four-carbon acetylenes (vinylacetylene plus ethylacetylene) was passed over the catalyst at 200° F., 15 p.s.i.g., 360 hourly space velocity and 3.5:1 mole ratio of hydrogen to acetylene. After three hours on stream, acetylene leakage was 950 p.p.m. (43.8% removed). Selectivity of the catalyst, however, was excellent, in that only 500–1000 p.p.m. of hydrogen was consumed, indicating little or no hydrogenation of the butadiene. When the reaction temperature was increased to 250° F. with other conditions maintained constant, acetylene leakage decreased to 520 p.p.m. and hydrogen consumption increased to 3900 p.p.m. (of 5950 fed).

Another batch of the catalyst described in the preceding paragraph was reduced at 500° F. for 17 hours. When the gas stream described in the paragraph above was passed over this catalyst at 150° F., 15 p.s.i.g., 360 hourly space velocity and a 3:1 mole ratio of hydrogen to acetylene, 70% or 3510 p.p.m. of the inlet hydrogen (5000 p.p.m.) was consumed after six hours and the acetylene clean-up was complete (100%).

I claim:

1. A catalyst which is effective in the selective hydrogenation of acetylenic triple bonds in the presence of conjugated double bonds which comprises a palladium-copper-chromium catalyst containing 20% to 70% copper oxide and 30% to 80% chromium oxide promoted with 0.04% to 1% palladium deposited predominantly on the surface thereof.

2. A metallic catalyst which is effective in the selective hydrogenation of acetylenic triple bonds in the presence of conjugated double bonds comprising a palladium-copper-chromium catalyst containing a binder selected from the group consisting of calcium aluminate cement and alumina, the metallic catalyst comprising 20% to 70% copper oxide, 30% to 80% chromium oxide and 0.04% to 1% palladium.

References Cited by the Examiner
UNITED STATES PATENTS

| | | | |
|---|---|---|---|
| 2,802,889 | 8/1957 | Frevel et al. | 260—677 |
| 2,927,141 | 3/1960 | Cohn et al. | 260—677 |
| 3,091,654 | 5/1963 | Kestner | 260—681.5 |

ALPHONSO D. SULLIVAN, *Primary Examiner.*

PAUL M. COUGHLAN, *Examiner.*